US011874770B2

(12) United States Patent
Kragel et al.

(10) Patent No.: US 11,874,770 B2
(45) Date of Patent: Jan. 16, 2024

(54) INDEXLESS LOGICAL-TO-PHYSICAL TRANSLATION TABLE

(71) Applicant: Western Digital Technologies, Inc., San Jose, CA (US)

(72) Inventors: Oleg Kragel, San Jose, CA (US); Vijay Sivasankaran, Dublin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/743,285

(22) Filed: May 12, 2022

(65) Prior Publication Data

US 2023/0367707 A1 Nov. 16, 2023

(51) Int. Cl.
*G06F 12/02* (2006.01)

(52) U.S. Cl.
CPC .................... *G06F 12/0246* (2013.01); *G06F 2212/7201* (2013.01)

(58) Field of Classification Search
CPC ......... G06F 12/0246; G06F 2212/7201; G06F 12/1009
See application file for complete search history.

(56) References Cited

U.S. PATENT DOCUMENTS

| | | | | |
|---|---|---|---|---|
| 8,909,851 | B2 | 12/2014 | Jones et al. | |
| 9,471,485 | B2 | 10/2016 | Kuo et al. | |
| 10,635,654 | B2 | 4/2020 | Hof et al. | |
| 10,852,973 | B2 | 12/2020 | Jung et al. | |
| 2009/0198902 | A1 * | 8/2009 | Khmelnitsky | G06F 12/0246 711/135 |

OTHER PUBLICATIONS

Jiang et al., "S-FTL: An Efficient Address Translation for Flash Memory by Exploiting Spatial Locality," IEEE, 2011 (12 pages).
Kang et al., "A Superblock-based Flash Translation Layer for NAND Flash Memory." IEEE, 2006 (pp. 161-170).

* cited by examiner

*Primary Examiner* — Chie Yew
(74) *Attorney, Agent, or Firm* — Michael Best & Friedrich LLP

(57) ABSTRACT

An indexless logical-to-physical translation table (L2PTT). In one example, the data storage device including a memory, a data storage controller, and a bus. The memory including a mapping unit staging page that includes a plurality of mapping unit pages and a mapping unit page directory. The data storage controller including a data storage controller memory and coupled to the memory, the data storage controller memory including an indexless logical-to-physical translation table (L2PTT). The bus for transferring data between the data storage controller and a host device in communication with the data storage controller. The data storage controller is configured to perform one or more memory operations with the indexless L2PTT.

20 Claims, 7 Drawing Sheets

200

205

210

| | | 0 | | 1 | | 2 | | 3 | | 4 | | 5 | | 6 | | 7 | |
|---|---|---|---|---|---|---|---|---|---|---|---|---|---|---|---|---|---|
| Mapping Unit Pages | 0 | Flash Address | | Flash Address | | Flash Address | | Flash Address | | Flash Address | | Flash Address | | Flash Address | | Flash Address | |
| | 1 | Flash Address | | Flash Address | | Flash Address | | Flash Address | | Flash Address | | Flash Address | | Flash Address | | Flash Address | |
| | 2 | Flash Address | | Flash Address | | Flash Address | | Flash Address | | Flash Address | | Flash Address | | Flash Address | | Flash Address | |
| | 3 | Flash Address | | Flash Address | | Flash Address | | Flash Address | | Flash Address | | Flash Address | | Flash Address | | Flash Address | |
| | ... | | | | | | | ... | | | | | | | | | |
| | 112 | Flash Address | | Flash Address | | Flash Address | | Flash Address | | Flash Address | | Flash Address | | Flash Address | | Flash Address | |
| Mapping Unit Pages Directory | 113 | MU Page 1DX | 0 | MU Page 1DX | 1 | MU Page 1DX | 2 | MU Page 1DX | 3 | MU Page 1DX | 4 | MU Page 1DX | 5 | MU Page 1DX | 6 | MU Page 1DX | 7 |
| | 114 | MU Page 1DX | 8 | MU Page 1DX | 9 | MU Page 1DX | 10 | MU Page 1DX | 11 | MU Page 1DX | 12 | MU Page 1DX | 13 | MU Page 1DX | 14 | MU Page 1DX | 15 |
| | ... | | | | | | | ... | | | | | | | | | |
| | 116 | MU Page 1DX | 24 | MU Page 1DX | 25 | MU Page 1DX | 26 | MU Page 1DX | 27 | MU Page 1DX | 28 | MU Page 1DX | 29 | MU Page 1DX | 30 | MU Page 1DX | 31 |
| | 117 | MU Page 1DX | 32 | MU Page 1DX | 33 | MU Page 1DX | 34 | MU Page 1DX | 35 | MU Page 1DX | 36 | MU Page 1DX | 37 | MU Page 1DX | 38 | MU Page 1DX | 39 |
| | 118 | MU Page 1DX | 40 | MU Page 1DX | 41 | MU Page 1DX | 42 | MU Page 1DX | 43 | MU Page 1DX | 44 | MU Page 1DX | 45 | MU Page 1DX | 46 | MU Page 1DX | 47 |
| | 119 | MU Page 1DX | 48 | MU Page 1DX | 49 | MU Page 1DX | 50 | MU Page 1DX | 51 | MU Page 1DX | 52 | MU Page 1DX | 53 | MU Page 1DX | 54 | MU Page 1DX | 55 |
| | 120 | MU Page 1DX | 56 | MU Page 1DX | 57 | MU Page 1DX | 58 | MU Page 1DX | 59 | MU Page 1DX | 60 | MU Page 1DX | 61 | MU Page 1DX | 62 | MU Page 1DX | 63 |
| | 121 | MU Page 1DX | 64 | MU Page 1DX | 65 | MU Page 1DX | 66 | MU Page 1DX | 67 | MU Page 1DX | 68 | MU Page 1DX | 69 | MU Page 1DX | 70 | MU Page 1DX | 71 |
| | 122 | MU Page 1DX | 72 | MU Page 1DX | 73 | MU Page 1DX | 74 | MU Page 1DX | 75 | MU Page 1DX | 76 | MU Page 1DX | 77 | MU Page 1DX | 78 | MU Page 1DX | 79 |
| | 123 | MU Page 1DX | 80 | MU Page 1DX | 81 | MU Page 1DX | 82 | MU Page 1DX | 83 | MU Page 1DX | 84 | MU Page 1DX | 85 | MU Page 1DX | 86 | MU Page 1DX | 87 |
| | 124 | MU Page 1DX | 88 | MU Page 1DX | 89 | MU Page 1DX | 90 | MU Page 1DX | 91 | MU Page 1DX | 92 | MU Page 1DX | 93 | MU Page 1DX | 94 | MU Page 1DX | 95 |
| | 125 | MU Page 1DX | 96 | MU Page 1DX | 97 | MU Page 1DX | 98 | MU Page 1DX | 99 | MU Page 1DX | 100 | MU Page 1DX | 101 | MU Page 1DX | 102 | MU Page 1DX | 103 |
| | 126 | MU Page 1DX | 104 | MU Page 1DX | 105 | MU Page 1DX | 106 | MU Page 1DX | 107 | MU Page 1DX | 108 | MU Page 1DX | 109 | MU Page 1DX | 110 | MU Page 1DX | 111 |
| | 127 | MU Page 1DX | 112 | - | | - | | - | | - | | - | | - | | - | |

| | |
|---|---|
| Size, KB | 4 |
| Capacity, Mapping Units: | 904 |

Mapping Unit Page Location Index

| | 0 | 1 | 2 | |
|---|---|---|---|---|
| 0 | 0 | 1 | 0 | 2 |
| 1 | 0 | 1 | 0 | 2 |
| 2 | 1 | 0 | 0 | 4 |
| 3 | 1 | 0 | 0 | 4 |
| 4 | 1 | 1 | 0 | 6 |
| 5 | 1 | 1 | 1 | UNINITIALIZED |
| 6 | 1 | 1 | 1 | UNINITIALIZED |
| 7 | 0 | 1 | 1 | 3 |
| 8 | 1 | 1 | 0 | 6 |
| 9 | 1 | 1 | 1 | UNINITIALIZED |
| 10 | 1 | 1 | 0 | 6 |
| 11 | 1 | 1 | 0 | 6 |
| 12 | 0 | 1 | 1 | 3 |
| 13 | 0 | 1 | 0 | 2 |
| 14 | 1 | 1 | 0 | 6 |
| 15 | 1 | 0 | 0 | 4 |
| 16 | 0 | 0 | 0 | 0 |
| 17 | 1 | 1 | 1 | UNINITIALIZED |
| 18 | 0 | 1 | 0 | 2 |
| | | . . . | | 0 |
| 599 999 999 | 0 | 0 | 1 | 1 |

| | | |
|---|---|---|
| Capacity, GB | 7680 | 15360 |
| Size, KB | 10986.33 | 21972.66 |
| Size, MB | 10.72884 | 21.45767 |

<- 3 bits forming a relative pointer to L2PTT storing Flash Block; can address up to 7 Flash Block with one value reserved for uninitialized state.

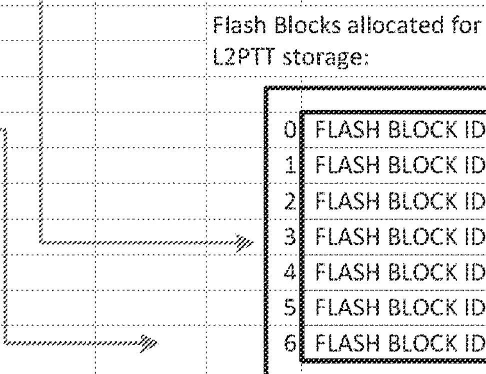

Flash Blocks allocated for L2PTT storage:

305

| | |
|---|---|
| 0 | FLASH BLOCK ID |
| 1 | FLASH BLOCK ID |
| 2 | FLASH BLOCK ID |
| 3 | FLASH BLOCK ID |
| 4 | FLASH BLOCK ID |
| 5 | FLASH BLOCK ID |
| 6 | FLASH BLOCK ID |

FIG. 3

INDEXLESS LOGICAL-TO-PHYSICAL TRANSLATION TABLE

FIELD

This application relates generally to data storage devices, and more particularly, to a data storage controller that implements an indexless (or near-indexless) logical to physical translation table to improve storage space usage and write amplification in data storage devices.

BACKGROUND

Generally, solid state drives (SSDs) that use dynamic random-access memory (DRAM) to cache a logical to physical translation table (L2PTT) in memory usually write dirty L2PTT pages to NAND. Some designs use a second level table (for example, a L2P directory) to track NAND location of the L2PTT pages. NAND location is tracked for restoring L2PTT pages after a power cycle. The L2PTT is also used during garbage collection of blocks that contain L2PTT. Some disadvantages with this approach include the amount of DRAM required for storing the second level table if the L2PTT is written in smaller pages and write amplification caused by the second level table (for example, 4K chunks of L2PTT needs DRAM in the ratio of 1:1000). L2PTT with larger pages may be used to reduce the DRAM footprint. However, using larger L2PTT pages results in increased write amplification caused by the L2PTT itself. For example, 32 KB L2PTT chunks result in 32K of flash write in addition to the 4K flash write of host data.

Conventional approaches involve constructing and maintaining single- or multi-level L2PTT index data structures that are used primarily (assuming L2PTT fully residents in RAM) during SSD initialization time. This conventional design has difficulties scaling to small L2PTT page sizes, which may be beneficial to lowering write amplification. The difficulties show as a massive amount of RAM dedicated to L2PTT index storage, which is inherent to single-level index design, or, in cases of multi-level index design, excessive firmware complexity as a result of "recursive" propagation of an index update across all of its levels, where write amplification is negatively impacted compared to single-level index design.

SUMMARY

To solve these and other problems, the embodiments described herein provide an indexless (or near-indexless) logical-to-physical translation table (L2PTT) that improves storage space usage and write amplification in data storage devices. The indexless L2PTT of the present disclosure is considered "indexless" because the indexless L2PTT of the present disclosure does not require a full L2PTT index stored in DRAM along with the indexless L2PTT of the present disclosure. Additionally, the L2PTT of the present disclosure may also be considered "near-indexless" because the L2PTT of the present disclosure may also use an L2PTT index that is significantly smaller than conventional L2PTT indexes, which provides space-saving in DRAM, although not as much as an indexless L2PTT.

In particular, the embodiments described herein provides a data storage controller including an indexless (or near-indexless) L2PTT with a mapping unit staging page stored in flash memory. The mapping unit staging page as described herein reduces or eliminates the need for an L2PTT index to be stored in DRAM along with a L2PTT.

Additionally, the present disclosure also introduces a mapping unit page location index. While the mapping unit page location index is an "index" that is initialized and stored in DRAM, the mapping unit page location index is not a L2PTT index (and the indexless L2PTT may truly be "indexless" with respect to indices in DRAM) and is smaller than a L2PTT index because the mapping unit page location index does not index full flash block addresses.

One embodiment of the present disclosure includes a data storage device. The data storage device including a memory, a data storage controller, and a bus. The memory including a mapping unit staging page that includes a plurality of mapping unit pages and a mapping unit page directory. The data storage controller including a data storage controller memory and coupled to the memory, the data storage controller memory including an indexless logical-to-physical translation table (L2PTT). The bus for transferring data between the data storage controller and a host device in communication with the data storage controller. The data storage controller is configured to perform one or more memory operations with the indexless L2PTT.

Another embodiment of the present disclosure includes a method. The method includes generating, with a data storage controller, an indexless logical-to-physical translation table (L2PTT) in a data storage controller memory of the data storage controller. The method includes staging, with the data storage controller, a mapping unit staging page based on the indexless L2PTT in a memory, the mapping unit staging page including a plurality of mapping unit pages and a mapping unit page directory. The method also includes performing, with the data storage controller, one or more memory operations with the indexless L2PTT.

Yet another embodiment of the present disclosure includes an apparatus. The apparatus includes means for generating an indexless logical-to-physical translation table (L2PTT) in a data storage controller memory of the data storage controller. The apparatus includes staging a mapping unit staging page based on the indexless L2PTT in a memory, the mapping unit staging page including a plurality of mapping unit pages and a mapping unit page directory. The apparatus also includes performing one or more memory operations with the indexless L2PTT.

Various aspects of the present disclosure provide for improvements data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 2 is a table illustrating an example structure of a single mapping unit staging page, accordance with some embodiments of the present disclosure.

FIG. 3 is a table illustrating an example mapping unit page location index, in accordance with some embodiments of the present disclosure.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
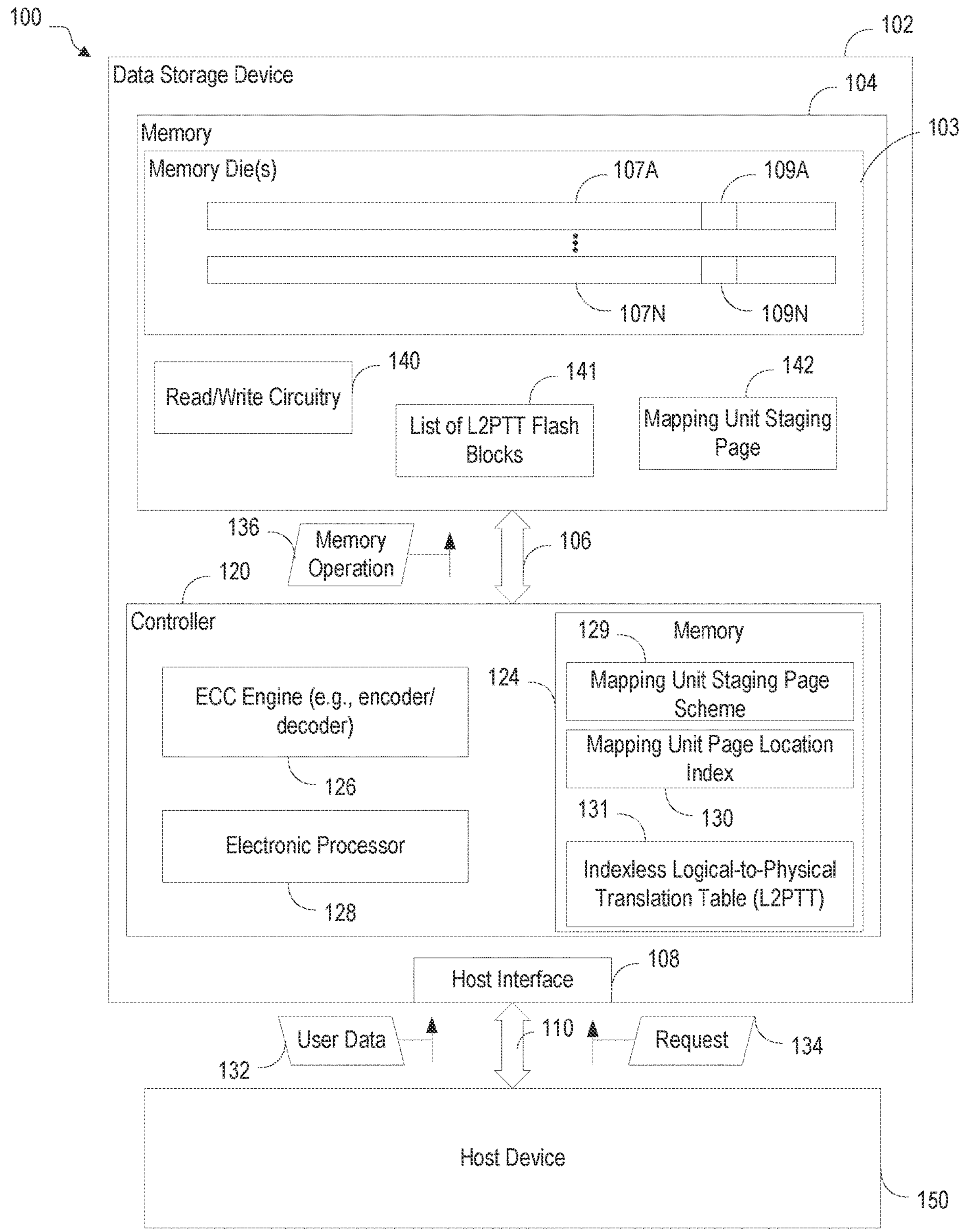
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. One skilled in the art would also recognize that the data storage device controller 120 may include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104 or to request data to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies. The memory 104 may also include a list of L2PTT flash blocks 141 and a mapping unit staging page 142 as described in greater detail below.

The data storage device 102 includes the data storage device controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150. For example, the data storage device controller 120 may send data to the host device 150 via the interface 108, and the data storage device controller 120 may receive data from the host device 150 via the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. In particular, the memory 124 stores a mapping unit staging page scheme 129, a mapping unit page location index 130, and an indexless logical-to-physical translation table (L2PTT) 131 as described in greater detail below.

Additionally, although the data storage device controller 120 is illustrated in FIG. 1 as including the memory 124, in other implementations, some or all of the memory 124 is instead located separate from the data storage device controller 120 and executable by the electronic processor 128 or a different electronic processor that is external to the data storage device controller 120 and/or the data storage device 102. For example, the memory 124 may be dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The data storage device controller 120 may send the memory operation 136 (e.g., a read command) to the memory 104 to cause the read/write circuitry 140 to sense data stored in a storage element. For example, the data storage device controller 120 may send the read command to the memory 104 in response to receiving a request for read access from the host device 150.

FIG. 2 is a table illustrating an example structure of a single mapping unit staging page 200, accordance with some embodiments of the present disclosure. The mapping unit staging page 200 of FIG. 2 corresponds to the mapping unit staging page 142 of FIG. 1 and is created by the mapping unit staging page scheme 129.

The mapping unit staging page 200 is a control page stored in flash blocks (e.g., flash blocks of the memory 104) dedicated for Logical to Physical Translation Table (L2PTT) storage. As illustrated in FIG. 2, each row from 0 to 112 holds a single mapping unit page (represented in FIG. 2 by reference numeral 205). In the illustrated example, the mapping unit staging page 200 includes a composition of eight mapping unit pages 205, where each mapping unit page 205 is associated with a flash block location of logically sequential host data mapping units. A single mapping unit page is a composition of eight (in this example of FIG. 2) flash block locations of logically sequential host data mapping units. Each host data mapping unit is associated with a certain 4K (or a multiple of 4K) host data chunk.

Following the example illustrated in FIG. 2, the flash block location of host logical block address (LBA) (assuming LBA size is 512B and Host Data Mapping Unit size is 4K) will be in mapping unit page with Index 2 in offset 4. Specifically, FIG. 2 shows an example of first mapping unit staging page for a sequentially preconditioned storage device, where LBA 160 resides in mapping unit page index 2 (i.e., 160/(8 sectors_per_HDMU*8 FlashAddresses_per_MUP)=2). According to how the mapping unit staging page is initialized, mapping unit page with index 2 is located row 2, and the actual FlashAddress of LBA 160 is located in row 2 column 4.

As further illustrated in FIG. 2, each row from 113 to the last row holds a mapping unit page directory (represented in FIG. 2 by reference numeral 210) that is initialized with mapping unit page indices of mapping unit pages 205 stored in rows 0 to 112.

Apart from the indexless L2PTT (e.g., the indexless L2PTT 131), which may be a flat-table in DRAM holding flash block locations of every host data mapping unit, there may be an additional data structure in DRAM of the data storage device 102. This additional data structure is referred to herein as "a mapping unit page location index." In some embodiments, the mapping unit page location index serves a purpose of tracking current locations of every single mapping unit page.

FIG. 3 is a table illustrating an example mapping unit page location index 300, in accordance with some embodiments of the present disclosure. The mapping unit page location index 300 corresponds to the mapping unit page location index 130 of FIG. 1. In some examples, the mapping unit page location index 300 is not saved in flash memory and is reconstructed by the mapping unit staging page scheme 129 during initialization of the data storage device 102.

Unlike typical L2PTT indices that track locations of every mapping unit page using full flash block addresses, the mapping unit page location index 300 indexes all mapping unit pages to one of a plurality of flash blocks. The plurality of flash blocks are stored in a list of flash blocks dedicated for L2PTT storage is used (represented in FIG. 3 by reference numeral 305). The list of flash blocks 305 corresponds to the list of L2PTT flash blocks 141 of FIG. 1.

The mapping unit page location index 300 requires less space in RAM than typical L2PTT indices because the full flash block address usually requires 32 bits or more in comparison to the mapping unit page location index 300 with, for example, seven flash blocks in a list (represented in FIG. 3 by reference numeral 305). In some embodiments, the mapping unit page location index 300 uses 3 bits with one "special value" reserved for tracking fully invalidated mapping unit pages (for example, an invalidated mapping unit page may be invalidated "from inside," which will not require external tracking), as illustrated in FIG. 3.

As described above, the embodiments described herein implements an indexless (or near-indexless) L2PTT (e.g., the indexless L2PTT 131) via performance of a L2PTT update operation, a closed L2PTT flash block compaction operation, a L2PTT initialization operation after a graceful shutdown, or a combination thereof using the mapping unit staging page 200.

Figure 4:
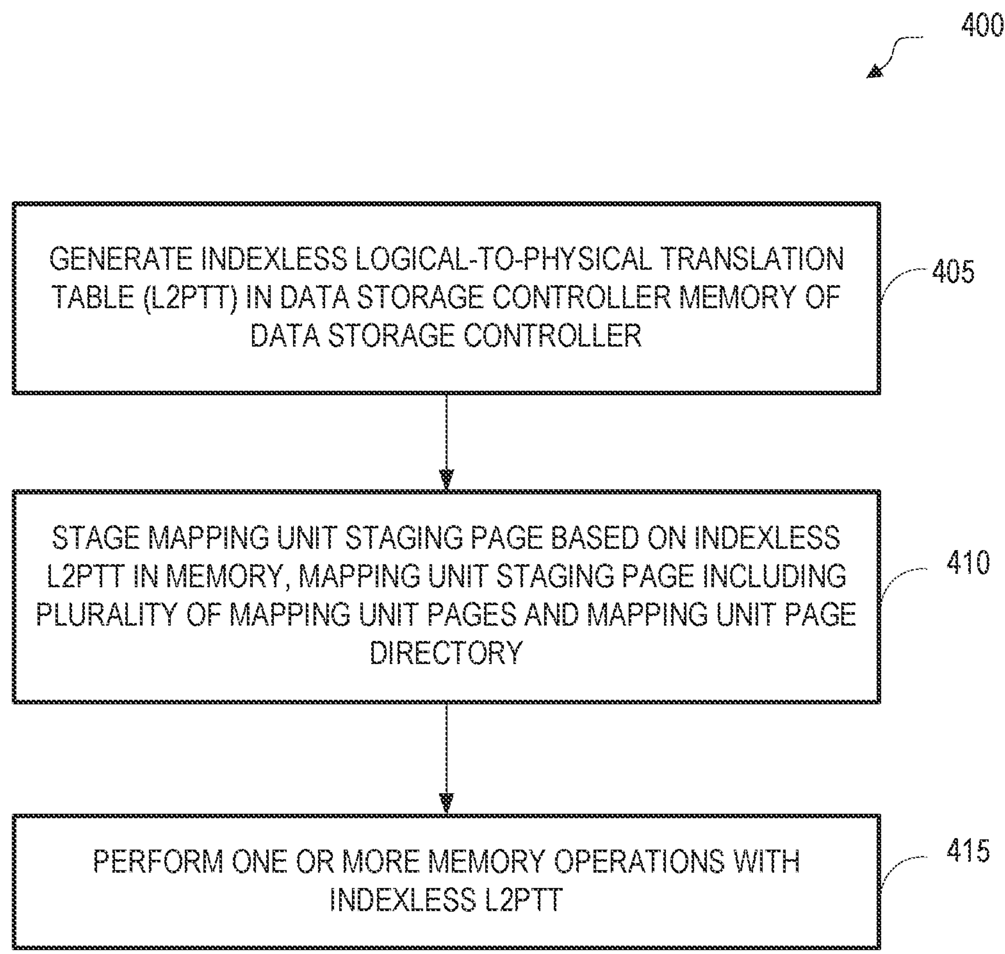
FIG. 4 is a flowchart illustrating a method of initializing the data storage device of FIG. 1, in accordance with some embodiments of the present disclosure.

FIG. 4 is a flowchart illustrating a method 400 of initializing the data storage device 102 of FIG. 1, in accordance with some embodiments of the present disclosure. The method 400 includes generating, with a data storage controller, an indexless logical-to-physical translation table (L2PTT) in a data storage controller memory of the data storage controller (at block 405).

The indexless L2PTT and the typical L2PTT are both arrays that store the flash addresses of every single host mapping unit of the data storage device. The offset in both arrays is the host mapping unit identifier (e.g., a logical block address (LBA)). However, the way the indexless L2PTT is serialized into flash is different from the typical L2PTT because the serialization is via Mapping Unit Staging Pages. Additionally, the housekeeping algorithm uses the Mapping Unit Page Location Index (RAM-only), which is small in size relative to the typical LS2PTT.

The method 400 includes staging, with the data storage controller, a mapping unit staging page based on the indexless L2PTT in a memory, the mapping unit staging page including a plurality of mapping unit pages and a mapping unit page directory (at block 410). The staging of the mapping unit staging page is described in greater detail below with respect to FIG. 4

The method 400 also includes performing, with the data storage controller, one or more memory operations with the indexless L2PTT (at block 415). The one or more memory operations are described in greater detail below with respect to FIGS. 5-8.

Figure 5:
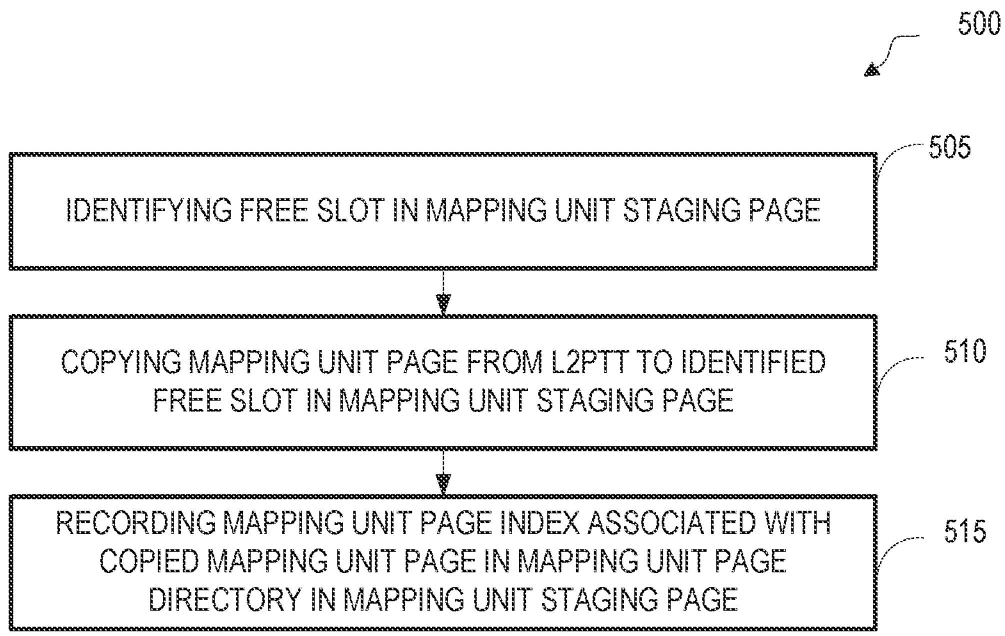
FIG. 5 is a flowchart illustrating a method of staging a mapping unit staging page for the data storage device of FIG. 1, in accordance with some embodiments of the present disclosure.

For example, FIG. 5 is a flowchart illustrating a method of staging a mapping unit staging page for the data storage device 102 of FIG. 1, in accordance with some embodiments of the present disclosure. In some embodiments, the method 500 of FIG. 5 illustrates a process of creating a mapping unit staging page (for example, the mapping unit staging page 142 of FIG. 1 and the mapping unit staging page 200 of FIG. 2) according to some embodiments (for example, adding a dirty mapping unit page). FIG. 5 is described with respect to FIGS. 1-3.

As illustrated in FIG. 5, the method 500 includes the data storage controller 120 identifying a free slot in a mapping unit staging page (at block 505). In some embodiments, a previously utilized slot holding the same mapping unit page may be identified and reused such as when repeated updates occur for the same mapping unit page.

After identifying a free slot in the mapping unit staging page (at block 505), the data storage controller 120 copies the mapping unit page from the indexless L2PTT 131 (stored in DRAM) to the identified slot in the mapping unit staging page 200 (at block 510). The data storage controller 120 then records the mapping unit page index of the copied mapping unit page in mapping unit page directory 210 (at block 515). In some embodiments, the data storage controller 120 records the mapping unit page index of the copied mapping unit page in a corresponding part of the mapping unit staging page.

Additionally, in some examples, the method 500 may include the data storage controller 120 updating a location of the dirty mapping unit page in the mapping unit page location index 300. For example, the data storage controller 120 updates the location by saving a relative index of currently write-open control flash block in a list of flash blocks dedicated for L2PTT storage. In some embodiments, when a last slot in the mapping unit staging page 200 is occupied, the data storage controller 120 dispatches the mapping unit staging page 200 for a write to write-open flash block.

Figure 6:
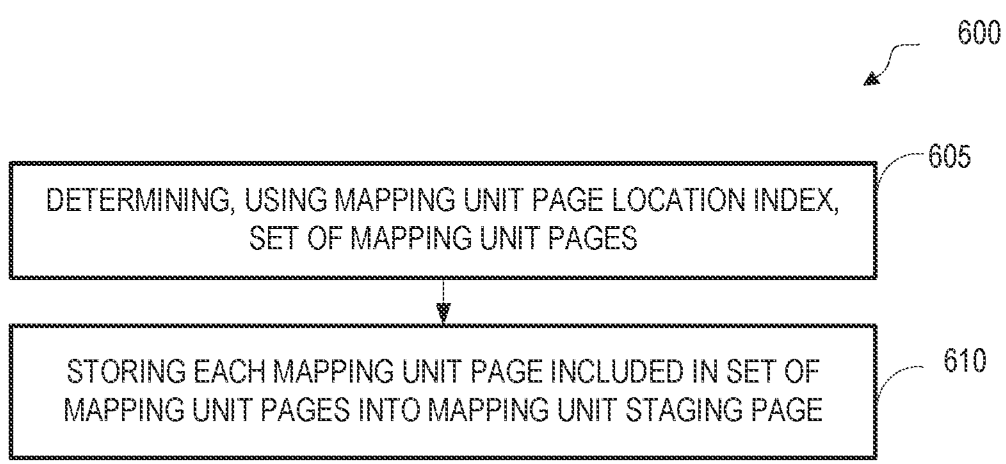
FIG. 6 is a flowchart illustrating a method of compaction for the data storage device of FIG. 1, in accordance with some embodiments of the present disclosure.

FIG. 6 is a flowchart illustrating a method 600 of compaction for the data storage device 102, in accordance with some embodiments of the present disclosure. FIG. 6 is described with respect to FIGS. 1-3.

In some embodiments, the method 600 of FIG. 6 illustrates a process of performing L2PTT flash block compaction (for example, a closed L2PTT flash block compaction operation) according to some embodiments. As illustrated in FIG. 6, the method 600 includes the data storage controller 120 determining, using the mapping unit page location index 300, one or more mapping unit pages (as a set of mapping unit pages) (at block 605). In some embodiments, the set of mapping unit pages includes mapping unit page(s) that remain valid in source compaction flash block. In some embodiments, hardware acceleration may be beneficial to process the mapping unit page location index data structure.

Additionally, the method 600 includes the data storage controller 120 storing each mapping unit page included in the set of mapping unit pages into the mapping unit staging page 200 (at block 610), as described above with respect to the method 500. As noted above, the indexless L2PTT 131 is stored in DRAM of the SSD controller (for example, the data storage controller 120). Accordingly, no reads from source compaction flash block are necessary.

Figure 7:
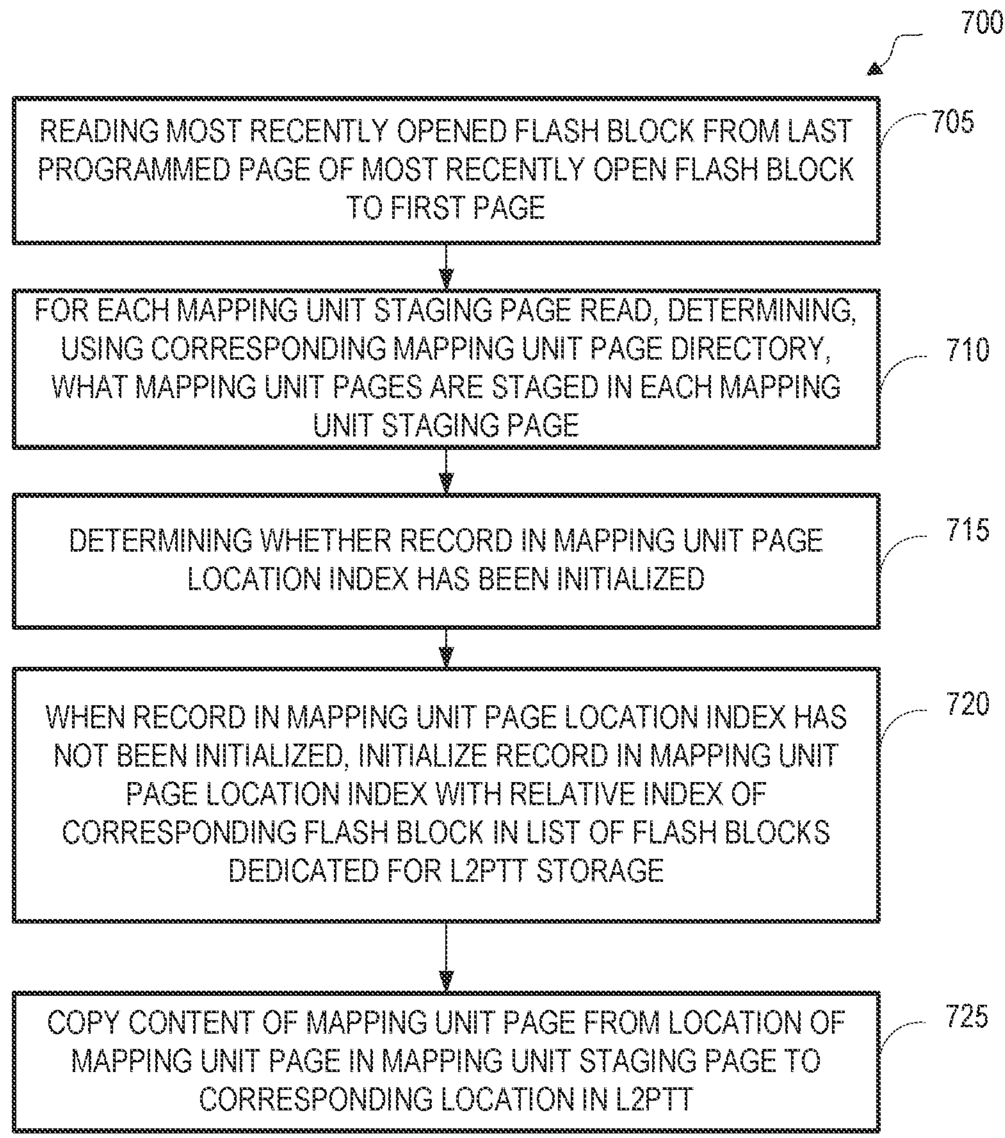
FIG. 7 is a flowchart illustrating a method of serial initialization for the data storage device of FIG. 1 after a graceful shutdown, in accordance with some embodiments of the present disclosure.

As noted above, in some embodiments, the data storage controller 120 may also perform a L2PTT initialization operation. In some embodiments, the indexless L2PTT initialization operation is a serial initialization operation. For example, FIG. 7 is a flowchart illustrating a method 700 of serial initialization of the indexless L2PTT after a graceful shutdown, in accordance with some embodiments of the present disclosure. FIG. 7 is described with respect to FIGS. 1-3.

As illustrated in FIG. 7, the method 700 includes the data storage controller 120 reading a most recently opened flash block from a last programmed page of the most recently open flash block to a first page (at block 705). For each mapping unit staging page read, the data storage controller 120 uses a corresponding mapping unit page directory 210 to determine what mapping unit pages 205 are staged in each mapping unit staging page 200 (at block 710). In some embodiments, the mapping unit page directory 210 is processed in reverse order (starting from the last record in the mapping unit page directory). Alternatively, in some embodiments, the mapping unit page directory 210 is not processed in reverse order, such as when each staged mapping unit page 205 has a single presence in the mapping unit staging page 200.

For each mapping unit page index in the mapping unit page directory 210, the data storage controller 120 determines whether a record (for a corresponding mapping unit page index) in the mapping unit page location index 300 has been initialized (at block 715). When a record is already initialized, no further work with this mapping unit page is required and the data storage controller 120 may proceed to the next record in the mapping unit page directory 210. In some embodiments, instead of directly using the mapping unit page location index 300 (stored in DRAM due to its size) for determinizing the initialization state, firmware, hardware, or a combination thereof may use a bit-array allocated in transient SRAM.

When a record is not initialized, the data storage controller 120 initializes the record in the mapping unit page location index 300 with a relative index of a corresponding flash block in a list of flash blocks dedicated for L2PTT storage (at block 720). After initializing the record, the data storage controller 120 copies the content of the mapping unit page from a location in the mapping unit staging page 200 to a corresponding location in the indexless L2PTT 131 in DRAM (at block 725).

Once all of the mapping unit pages 205 are initialized, the initialization of the indexless L2PTT 131 is considered completed. However, in some embodiments, when all the mapping unit pages 205 currently being initialized from flash blocks have been processed but the indexless L2PTT initialization is not yet completed, initialization is switched to a previous open flash block from a list of flash blocks dedicated for L2PTT storage. In some embodiments, all flash blocks dedicated for L2PTT storage need to be initialized (for example, a read in full situation). For example, a case where all the mapping unit staging page buffers read require processing. In such embodiments, the initialization process (for example, method 700) may be performed with the assistance of hardware acceleration.

Figure 8:
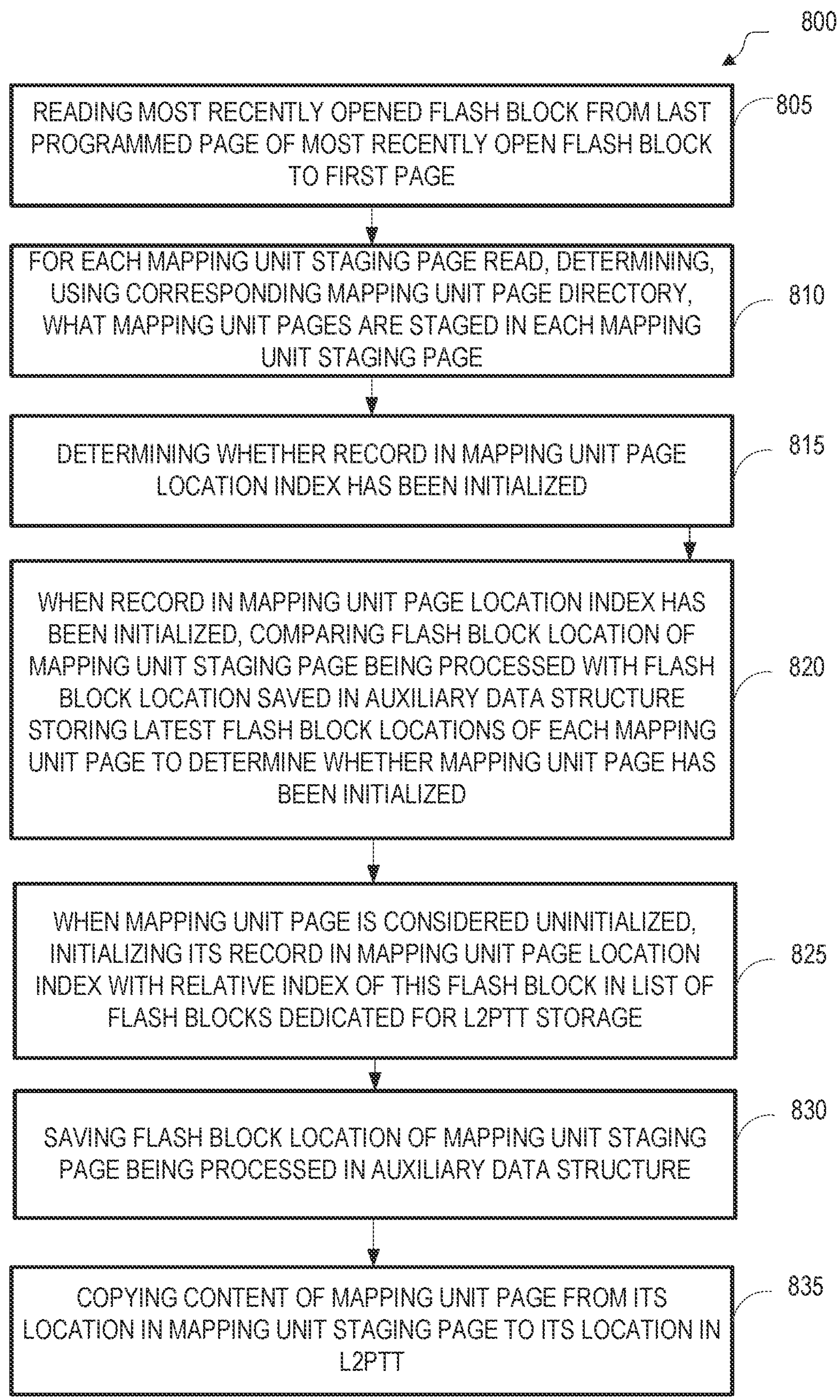
FIG. 8 is a flowchart illustrating a method of parallel initialization for the data storage device of FIG. 1 after a graceful shutdown, in accordance with some embodiments of the present disclosure.

In some embodiments, the indexless L2PTT initialization operation is performed as a parallel initialization operation. For example, FIG. 8 is a flowchart illustrating a method 800 of parallel initialization of the indexless L2PTT after a graceful shutdown, in accordance with some embodiments of the present disclosure. FIG. 8 is described with respect to FIGS. 1-3.

As illustrated in FIG. 8, the method 800 includes the data storage controller 120 reading one (or a segment of one where extra levels of parallelism are beneficial) open flash block from the last programmed page of the open flash block to the first page (at block 805). For every mapping unit staging page 200 read, the data storage controller 120 determines, using a corresponding mapping unit page directory 210, what mapping unit pages 205 are staged in the corresponding mapping unit staging page 200 (at block 810).

In some embodiments, the mapping unit page directory 210 is processed in reverse order (starting from the last record in the mapping unit page directory 210). Alternatively, in some embodiments, the mapping unit page directory 210 is not processed in reverse order, such as when each staged mapping unit page 205 has a single presence in the mapping unit staging page 200. For each mapping unit page index included in the mapping unit page directory 210, the data storage controller 120 determines whether a record (for a corresponding mapping unit page) in the mapping unit page location index 300 has been initialized (at block 815).

When a record is already initialized, the data storage controller 120 compares the flash block location of the mapping unit page being processed with the flash block location saved in an auxiliary initialization time only flat array (for example, as an auxiliary data structure) storing the latest flash block locations of every single mapping unit page (at block 820).

When the flash block location of the mapping unit page being processed was written before the flash block location saved in the auxiliary data structure, no further work with this mapping unit page is required and the method 800 (for example, the data storage controller 120) moves to the next mapping unit page in the mapping unit page directory 210. When the flash block location of the mapping unit page being processed was written after the flash block location saved in the auxiliary data structure, the data storage controller 120 considers the mapping unit page as uninitialized. In some embodiments, instead of directly using the mapping unit page location index 300 (stored in DRAM due to its size) for determinizing the initialization state, firmware, hardware, or a combination thereof may use a bit-array allocated in transient SRAM.

When a mapping unit page is considered uninitialized, the data storage controller 120 initializes its record in the mapping unit page location index 300 with a relative index of this flash block in a list of flash blocks dedicated for L2PTT storage 141 (at block 825). Additionally, the data storage controller 120 may save the flash block location of the mapping unit page being processed in the auxiliary data structure (at block 830).

As illustrated in FIG. 8, the method 800 also includes copying the content of the mapping unit page from its location in the mapping unit staging page 200 to its location in the indexless L2PTT 131 in DRAM (at block 835). When all of the mapping unit pages 205 are initialized, the indexless L2PTT initialization cannot be considered complete until all flash blocks dedicated for L2PTT storage are processed in full. The parallel version of the initialization process addresses scaling concerns, as described in greater detail above.

Example 1: a data storage device comprising: a memory including a mapping unit staging page that includes a plurality of mapping unit pages and a mapping unit page directory; a data storage controller including a data storage controller memory and coupled to the memory, the data storage controller memory including an indexless logical-to-physical translation table (L2PTT); and a bus for transferring data between the data storage controller and a host device in communication with the data storage controller, wherein the data storage controller is configured to perform one or more memory operations with the indexless L2PTT.

Example 2: the data storage device of example 1, wherein the one or more memory operations include at least one of: an indexless L2PTT update operation, a closed indexless L2PTT flash block compaction operation, or an indexless L2PTT initialization operation after a graceful shutdown.

Example 3: the data storage device of example 2, wherein the indexless L2PTT update operation is an operation to program an updated mapping unit page to a write-open flash block.

Example 4: the data storage device of example 2, wherein the indexless L2PTT update operation includes: identifying a free slot in the mapping unit staging page, copying a mapping unit page from the indexless L2PTT to the identified free slot in the mapping unit staging page, and recording a mapping unit page index associated with the copied mapping unit page in the mapping unit page directory in the mapping unit staging page.

Example 5: the data storage device of example 2, wherein the closed indexless L2PTT flash block compaction operation includes programming at least one component of the indexless L2PTT that is still valid in source compaction flash block to a destination flash block and performing source flash block recycling.

Example 6: the data storage device of example 2, wherein the closed indexless L2PTT flash block compaction operation includes the data storage controller configured to: determine, with a mapping unit page location index, a set of mapping unit pages, wherein each mapping unit page included in the set of mapping unit pages are valid, and store the each mapping unit page included in the set of mapping unit pages into the mapping unit staging page.

Example 7: the data storage device of example 2, wherein the indexless L2PTT initialization operation is a serial initialization operation.

Example 8: the data storage device of example 7, wherein the memory includes a list of flash blocks dedicated for L2PTT storage, wherein the data storage controller memory further includes a mapping unit page location index, and wherein the serial initialization operation includes the data storage controller configured to: determine, with the mapping unit page directory, a set of mapping unit pages staged in the mapping unit staging page, process the mapping unit page directory, and for each mapping unit page index included in the mapping unit page directory, determine whether a record in the mapping unit page location index has been initialized, when the record in the mapping unit page location index has not been initialized, initialize the record in the mapping unit page location index with a relative index of a corresponding flash block in the list of flash blocks dedicated for L2PTT storage, and copy content of a mapping unit page from a location of the mapping unit page in the mapping unit staging page to a corresponding location in the indexless L2PTT.

Example 9: the data storage device of example 2, wherein the indexless L2PTT initialization operation is a parallel initialization operation.

Example 10: the data storage device of example 9, wherein the memory includes a list of flash blocks dedicated for L2PTT storage, wherein the data storage controller memory further includes a mapping unit page location index, and wherein the parallel initialization operation includes the data storage controller configured to: determine, using the mapping unit page directory, a set of mapping unit pages from the plurality of mapping unit pages that are staged in the mapping unit staging page, process the mapping unit page directory, and for each mapping unit page index included in the mapping unit page directory, determine whether a record in the mapping unit page location index has been initialized, when the record in the mapping unit page location index has been initialized, compare a first flash block location of a mapping unit page being processed with a second flash block location saved in an auxiliary data structure storing latest flash block locations of each mapping unit page to determine whether the mapping unit page has been initialized, when the record in the mapping unit page location index has not been initialized, initialize the record in the mapping unit page location index with a relative index of a corresponding flash block in the list of flash blocks dedicated for L2PTT storage, and save the first flash block location of the mapping unit page being processed in the auxiliary data structure, and copy content of the mapping unit page from a location of the mapping unit page in the mapping unit staging page to a corresponding location in the indexless L2PTT.

Example 11: the data storage device of example 10, wherein the data storage controller is configured to determine that the mapping unit page is uninitialized when the first flash block location of the mapping unit page being processed was written before the second flash block location was saved in the auxiliary data structure.

Example 12: the data storage device of example 10, wherein the data storage controller is configured to determine that the mapping unit page is initialized when the first flash block location of the mapping unit page being processed was written after the second flash block location was saved in the auxiliary data structure.

Example 13: a method comprising: generating, with a data storage controller, an indexless logical-to-physical translation table (L2PTT) in a data storage controller memory of the data storage controller; staging, with the data storage controller, a mapping unit staging page based on the indexless L2PTT in a memory, the mapping unit staging page including a plurality of mapping unit pages and a mapping unit page directory; and performing, with the data storage controller, one or more memory operations with the indexless L2PTT.

Example 14: the method of example 13, wherein the one or more memory operations is a L2PTT update operation that includes identifying a free slot in the mapping unit staging page, copying a mapping unit page from the indexless L2PTT to the identified free slot in the mapping unit staging page, and recording a mapping unit page index associated with the copied mapping unit page in the mapping unit page directory in the mapping unit staging page.

Example 15: the method of example 13, wherein the one or more memory operations is a closed L2PTT flash block compaction operation includes determining, with the data storage controller and a mapping unit page location index, a set of mapping unit pages, wherein each mapping unit page included in the set of mapping unit pages are valid, and storing the each mapping unit page included in the set of mapping unit pages into the mapping unit staging page.

Example 16: the method of example 13, wherein the one or more memory operations is a L2PTT initialization operation that includes performing a serial initialization operation.

Example 17: the method of example 16, wherein the memory includes a list of flash blocks dedicated for L2PTT storage, wherein the data storage controller memory further includes a mapping unit page location index, and wherein the serial initialization operation includes determining, using the mapping unit page directory, a set of mapping unit pages staged in the mapping unit staging page, processing the mapping unit page directory, and for each mapping unit page index included in the mapping unit page directory, determine whether a record in the mapping unit page location index has been initialized, when the record in the mapping unit page location index has not been initialized, initialize the record in the mapping unit page location index with a relative index of a corresponding flash block in the list of flash blocks dedicated for L2PTT storage, and copy content of a mapping unit page from a location of the mapping unit page in the mapping unit staging page to a corresponding location in the indexless L2PTT.

Example 18: the method of example 13, wherein the one or more memory operations is a L2PTT initialization operation that includes performing a parallel initialization operation.

Example 19: the method of example 18, wherein the memory includes a list of flash blocks dedicated for L2PTT storage, wherein the data storage controller memory further includes a mapping unit page location index, and wherein the parallel initialization operation includes determining, using the mapping unit page directory, a set of mapping unit pages staged in the mapping unit staging page, processing the mapping unit page directory, and for each mapping unit page index included in the mapping unit page directory, determine whether a record in the mapping unit page location index has been initialized, when the record in the mapping unit page location index has been initialized, compare a first flash block location of a mapping unit page being processed with a second flash block location saved in an auxiliary data structure storing latest flash block locations of each mapping unit page to determine whether the mapping unit page has been initialized, when the record in the mapping unit page location index has not been initialized, initialize the record in the mapping unit page location index with a relative index of a corresponding flash block in the list of flash blocks dedicated for L2PTT storage, and save the first flash block location of the mapping unit page being processed in the auxiliary data structure, and copy content of the mapping unit page from a location of the mapping unit page in the mapping unit staging page to a corresponding location in the indexless L2PTT.

Example 20: an apparatus comprising: means for generating an indexless logical-to-physical translation table (L2PTT) in a data storage controller memory of a data storage controller; means for a mapping unit staging page based on the indexless L2PTT in a memory, the mapping unit staging page including a plurality of mapping unit pages and a mapping unit page directory; and means for performing one or more memory operations with the indexless L2PTT.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:

a memory including a mapping unit staging page that includes i) a plurality of mapping unit pages and ii) a mapping unit page directory;

a data storage controller including a data storage controller memory, the data storage controller coupled to the memory, and the data storage controller memory including an indexless logical-to-physical translation table (L2PTT); and a bus for transferring data between the data storage controller and a host device in communication with the data storage controller, wherein the data storage controller is configured to perform one or more memory operations with the indexless L2PTT.

2. The data storage device of claim 1, wherein the one or more memory operations include at least one of:

an indexless L2PTT update operation, a closed indexless L2PTT flash block compaction operation, or an indexless L2PTT initialization operation after a graceful shutdown.

3. The data storage device of claim 2, wherein the indexless L2PTT update operation is an operation to program an updated mapping unit page to a write-open flash block.

4. The data storage device of claim 2, wherein the indexless L2PTT update operation includes:

identifying a free slot in the mapping unit staging page, copying a mapping unit page from the indexless L2PTT to the identified free slot in the mapping unit staging page, and recording a mapping unit page index, associated with the copied mapping unit page, in the mapping unit page directory in the mapping unit staging page.

5. The data storage device of claim 2, wherein the closed indexless L2PTT flash block compaction operation includes i) programming, at least one component of the indexless L2PTT that is still valid in source compaction flash block, to a destination flash block and ii) performing source flash block recycling.

6. The data storage device of claim 2, wherein the closed indexless L2PTT flash block compaction operation includes the data storage controller configured to:

determine, with a mapping unit page location index, a set of mapping unit pages, wherein each mapping unit page, included in the set of mapping unit pages is valid, and store the each mapping unit page, included in the set of mapping unit pages, into the mapping unit staging page.

7. The data storage device of claim 2, wherein the indexless L2PTT initialization operation is a serial initialization operation.

8. The data storage device of claim 7, wherein the memory includes a list of flash blocks dedicated for L2PTT storage, wherein the data storage controller memory further includes a mapping unit page location index, and wherein the serial initialization operation includes the data storage controller configured to:

determine, with the mapping unit page directory, a set of mapping unit pages staged in the mapping unit staging page, process the mapping unit page directory, and for each mapping unit page index included in the mapping unit page directory, determine whether a record in the mapping unit page location index has been initialized, when the record in the mapping unit page location index has not been initialized, initialize the record, in the mapping unit page location index, with a relative index of a corresponding flash block in the list of flash blocks dedicated for L2PTT storage, and copy content of a mapping unit page from a location of the mapping unit page, in the mapping unit staging page, to a corresponding location in the indexless L2PTT.

9. The data storage device of claim 2, wherein the indexless L2PTT initialization operation is a parallel initialization operation.

10. The data storage device of claim 9, wherein the memory includes a list of flash blocks dedicated for L2PTT storage, wherein the data storage controller memory further includes a mapping unit page location index, and wherein the parallel initialization operation includes the data storage controller configured to:

determine, using the mapping unit page directory, a set of mapping unit pages from the plurality of mapping unit pages that are staged in the mapping unit staging page, process the mapping unit page directory, and for each mapping unit page index included in the mapping unit page directory, determine whether a record in the mapping unit page location index has been initialized, when the record in the mapping unit page location index has been initialized, compare i) a first flash block location of a mapping unit page being processed with ii a second flash block location saved in an auxiliary data structure storing latest flash block locations of each mapping unit page, to determine whether the mapping unit page has been initialized, when the mapping unit page has not been initialized, initialize the record, in the mapping unit page location index, with a relative index of a corresponding flash block in the list of flash blocks dedicated for L2PTT storage, and save, in the auxiliary data structure, the first flash block location of the mapping unit page being processed, and copy content of the mapping unit page from a location of the mapping unit page, in the mapping unit staging page, to a corresponding location in the indexless L2PTT.

11. The data storage device of claim 10, wherein the data storage controller is configured to determine that the mapping unit page is uninitialized when the first flash block location, of the mapping unit page being processed, was written after the second flash block location was saved in the auxiliary data structure.

12. The data storage device of claim 10, wherein the data storage controller is configured to determine that the mapping unit page is initialized when the first flash block location, of the mapping unit page being processed, was written after before the second flash block location was saved in the auxiliary data structure.

13. A method comprising:

generating, with a data storage controller, an indexless logical-to-physical translation table (L2PTT) in a data storage controller memory of the data storage controller;

staging, with the data storage controller, a mapping unit staging page, based on the indexless L2PTT, in a memory, the mapping unit staging page including a plurality of mapping unit pages and a mapping unit page directory; and performing, with the data storage controller, one or more memory operations with the indexless L2PTT.

14. The method of claim 13, wherein the one or more memory operations is a L2PTT update operation that includes identifying a free slot in the mapping unit staging page, copying a mapping unit page from the indexless L2PTT to the identified free slot in the mapping unit staging page, and recording a mapping unit page index, associated with the copied mapping unit page, in the mapping unit page directory in the mapping unit staging page.

15. The method of claim 13, wherein the one or more memory operations is a closed L2PTT flash block compaction operation includes determining, with the data storage controller and a mapping unit page location index, a set of mapping unit pages, wherein each mapping unit page, included in the set of mapping unit pages, is valid, and storing the each mapping unit page, included in the set of mapping unit pages, into the mapping unit staging page.

16. The method of claim 13, wherein the one or more memory operations is a L2PTT initialization operation that includes performing a serial initialization operation.

17. The method of claim 16, wherein the memory includes a list of flash blocks dedicated for L2PTT storage, wherein the data storage controller memory further includes a mapping unit page location index, and wherein the serial initialization operation includes determining, using the mapping unit page directory, a set of mapping unit pages staged in the mapping unit staging page, processing the mapping unit page directory, and for each mapping unit page index included in the mapping unit page directory, determine whether a record in the mapping unit page location index has been initialized, when the record in the mapping unit page location index has not been initialized, initialize the record, in the mapping unit page location index, with a relative index of a corresponding flash block in the list of flash blocks dedicated for L2PTT storage, and copy content of a mapping unit page from a location of the mapping unit page, in the mapping unit staging page, to a corresponding location in the indexless L2PTT.

18. The method of claim 13, wherein the one or more memory operations is a L2PTT initialization operation that includes performing a parallel initialization operation.

19. The method of claim 18, wherein the memory includes a list of flash blocks dedicated for L2PTT storage, wherein the data storage controller memory further includes a mapping unit page location index, and wherein the parallel initialization operation includes determining, using the mapping unit page directory, a set of mapping unit pages staged in the mapping unit staging page, processing the mapping unit page directory, and for each mapping unit page index included in the mapping unit page directory, determine whether a record in the mapping unit page location index has been initialized, when the record in the mapping unit page location index has been initialized, compare i) a first flash block location of a mapping unit page being processed with ii) a second flash block location saved in an auxiliary data structure storing latest flash block locations of each mapping unit page, to determine whether the mapping unit page has been initialized, when the mapping unit page has not been initialized, initialize the record, in the mapping unit page location index, with a relative index of a corresponding flash block in the list of flash blocks dedicated for L2PTT storage, and save, in the auxiliary data structure, the first flash block location of the mapping unit page being processed, and copy content of the mapping unit page from a location of the mapping unit page, in the mapping unit staging page, to a corresponding location in the indexless L2PTT.

20. A non-transitory computer-readable medium comprising instructions that, when executed by an electronic processor, cause the electronic processor to perform a set of operations comprising:

generating an indexless logical-to-physical translation table (L2PTT) in a data storage controller memory of a data storage controller;

staging a mapping unit staging page, based on the indexless L2PTT, in a memory, the mapping unit staging page including a plurality of mapping unit pages and a mapping unit page directory; and performing one or more memory operations with the indexless L2PTT.

* * * * *